G. M. THOMPSON.
CAR-STARTER.

No. 190,930. Patented May 15, 1877.

WITNESSES
Robert Everett,
George H. Lanier.

INVENTOR
George M. Thompson,
Gilmore, Smith & Co.
ATTORNEYS.

N. PETERS, PHOTO-LITHOGRAPHER, WASHINGTON, D.C.

UNITED STATES PATENT OFFICE.

GEORGE M. THOMPSON, OF BOSTON, MASSACHUSETTS.

IMPROVEMENT IN CAR-STARTERS.

Specification forming part of Letters Patent No. 190,930, dated May 15, 1877; application filed May 1, 1877.

*To all whom it may concern:*

Be it known that I, GEORGE M. THOMPSON, of Boston, in the county of Suffolk and State of Massachusetts, have invented a new and valuable Improvement in Horse-Car Starters; and do hereby declare that the following is a full, clear, and exact description of the construction and operation of the same, reference being had to the annexed drawings, making a part of this specification, and to the letters and figures of reference marked thereon.

Figure 1:
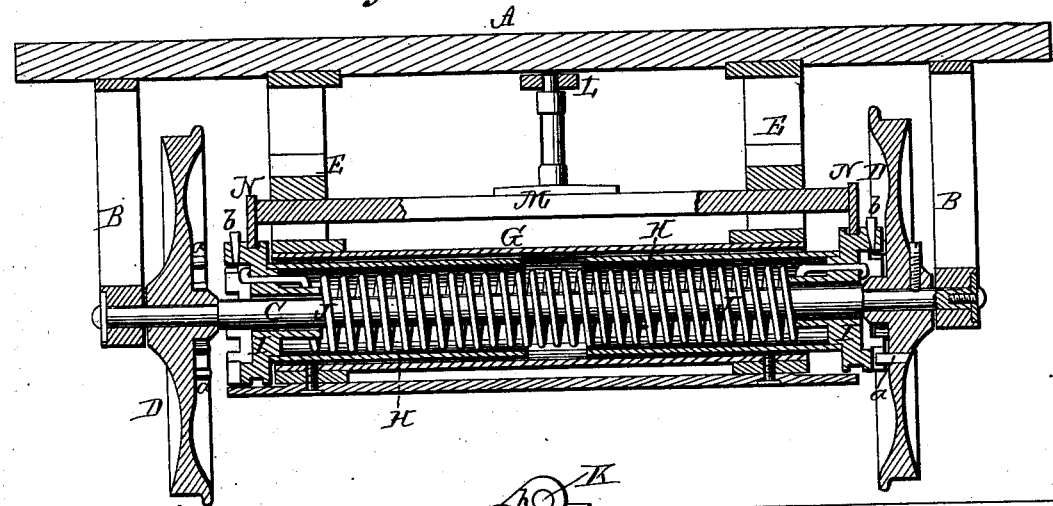
Figure 2:
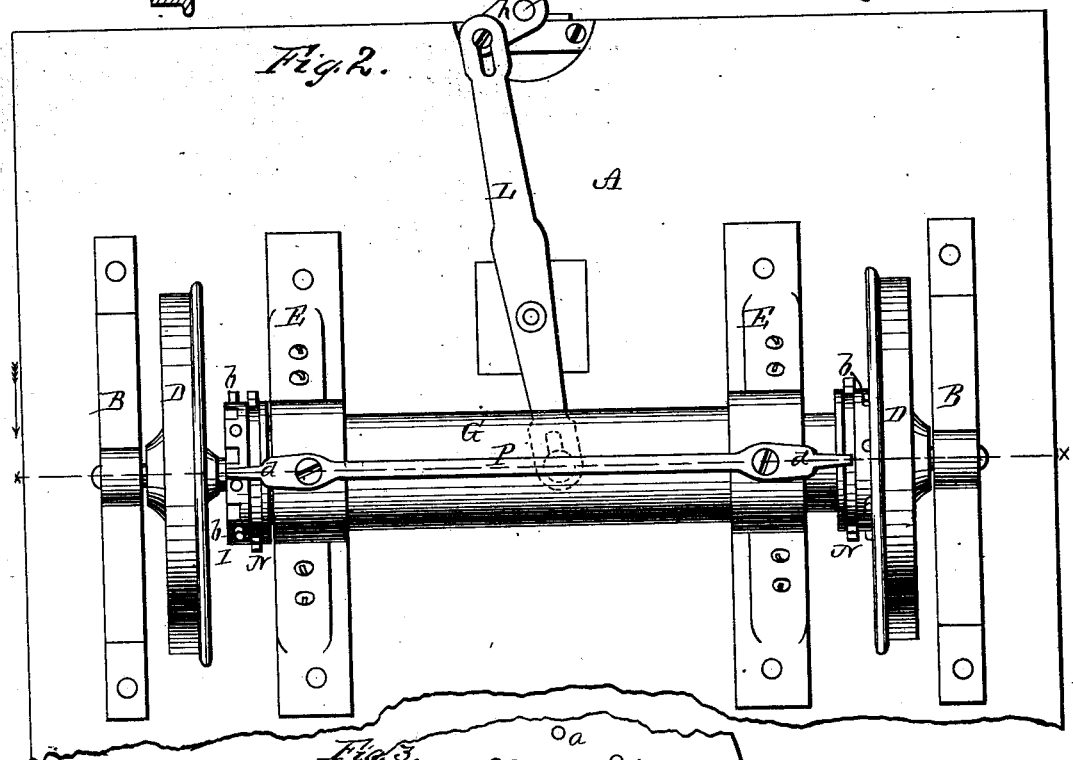
Figure 3:
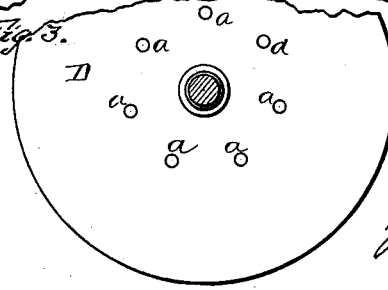

Figure 1 of the drawings is a representation of a transverse vertical section of my horse-car starter, and Fig. 2 is a plan view of the same. Fig. 3 is a detail view thereof.

The nature of my invention consists in the construction and arrangement of a car-brake for horse-cars, forming also a car-starter, as will be hereinafter more fully set forth.

In the annexed drawings, A represents part of the car-frame, with hangers or boxes B B, in which the axle C has its bearings.

D D are the wheels secured on the axle C, said wheels having each upon its inner side a series of clutch-pins, $a$, set in a circle concentric with the axle.

E E are additional hangers, secured to the frame A and supporting a cylinder, G, which surrounds the axle C between the wheels, leaving, however, a suitable space between each end of the cylinder and the wheel.

In each end of the cylinder G is inserted a tube or sleeve, H, attached at its outer end to a clutch, I, and the two clutches I I are connected by a large and strong coil-spring, J, placed within the tubes H H, and surrounding the axle C, as shown in Fig. 1.

At the end of the car is the ordinary brake-rod K, having a crank, $h$, upon its lower end, which works in a slot in the outer end of a lever, L, pivoted under the car, the rear end of said lever being connected to a bar, M, which slides in guides in the hangers E, and at each end of said bar is a fork, N, entering a circumferential groove on the clutch I.

Each clutch I is provided with a series of pins, $b$, extending radially therefrom at suitable distances apart.

To the under sides of the hangers E is secured a bar, P, having tapering ends $d$, as shown.

The operation is substantially as follows: When the car is in motion the two clutches I I are held away from the wheels B; then, when it is desired to stop the car, the brake-rod K is turned either to the right or left, according to the direction in which the car is moving, whereby the bar M is moved to one side, carrying with it the clutches I, tubes H, and spring J, so that one clutch will engage with the pins $a$ on the driving-wheel on that side, while the clutch on the other side is, by means of one of its pins $b$, stopped by the pointed end $d$ of the bar P. One end of the spring J being thus held stationary by said bar P, and the car still moving, the spring is wound up by the clutch that has engaged with the wheel, and acts as a brake to stop the car.

It will readily be seen that a power is now stored up which may be utilized in assisting to start the car by suddenly reversing the brake-rod K, so as to throw the other clutch in gear. The spring then, unwinding, aids in moving the car forward.

As soon as the car is started the brake-rod should be turned, so as to throw both clutches out of gear.

What I claim as new, and desire to secure by Letters Patent, is—

1. The stationary bar P, with pointed or tapering ends $d$, in combination with the radial pins $b$ on the clutches I, for the purposes herein set forth.

2. The combination, with the axle C and wheels D, having pins $a$, as described, of the casing G, tubes H, clutches I, with pins $b$, spring J, bar P, and operating mechanism K L M N, all constructed and arranged to operate substantially as and for the purposes herein set forth.

In testimony that I claim the above I have hereunto subscribed my name in the presence of two witnesses.

GEO. M. THOMPSON.

Witnesses:
H. F. BUSWELL,
CHARLES H. WALCOTT.